United States Patent [19]

Maucher et al.

[11] 4,410,074
[45] Oct. 18, 1983

[54] FRICTION CLUTCH ASSEMBLY

[75] Inventors: Paul Maucher, Sasbach; Oswald Friedmann, Lichtenau, both of Fed. Rep. of Germany

[73] Assignee: Luk Lamellen und Kupplungsbau GmbH, Bühl, Fed. Rep. of Germany

[21] Appl. No.: 250,314

[22] Filed: Apr. 2, 1981

[30] Foreign Application Priority Data

Apr. 5, 1980 [DE] Fed. Rep. of Germany ....... 3013298

[51] Int. Cl.³ .................. F02N 5/04; F16D 21/06; F16D 13/44
[52] U.S. Cl. ........................ 192/48.7; 74/7 C; 74/572; 123/179 J; 192/70.27; 192/89 B; 192/96
[58] Field of Search ............... 192/48.7, 48.8, 70.27, 192/89 B, 96; 74/572, 7 C; 123/179 J

[56] References Cited

U.S. PATENT DOCUMENTS 4,317,435  3/1982  Kohlhage ..................... 123/179 J
4,366,887  1/1983  Hofbauer et al. ............. 192/96 X

FOREIGN PATENT DOCUMENTS 2116423  10/1972  Fed. Rep. of Germany .... 192/89 B

Primary Examiner—Allan D. Herrmann
Attorney, Agent, or Firm—Kontler, Grimes & Battersby

[57] ABSTRACT

A friction clutch assembly wherein the first of two coaxial friction clutches has a friction disc driven by the crankshaft of an internal combustion engine and driving two pressure plates forming part of a flywheel which includes a second friction clutch whose friction disc drives the input shaft of the change-speed transmission in an automotive vehicle. The friction disc of the second clutch is flanked by the pressure plates of the respective clutch, and each clutch has an axially movable pressure plate and an axially fixed pressure plate. The axially fixed pressure plate of one clutch can be integral with the axially fixed pressure plate of the other clutch. The clutches can be engaged or disengaged by a common actuating system having a common dished spring the radially outermost region of which biases the axially movable pressure plate of one of the clutches. A second region which is located radially inwardly of the outermost region of the dished spring biases the axially movable pressure plate of the other clutch in engaged condition of the clutches. A second dished spring can be used to bias the axially movable pressure plate of the one clutch in engaged condition of the one clutch. The second spring can exert force by way of the common dished spring. The radially innermost portion of the common dished spring is movable axially in a given direction to engage the clutches and counter to such direction to disengage the clutches. The second clutch is disengaged ahead of the first clutch, and the first clutch is engaged ahead of the second clutch.

52 Claims, 3 Drawing Figures

FRICTION CLUTCH ASSEMBLY

CROSS-REFERENCE TO RELATED CASE

A friction clutch assembly which is identical with the assembly shown in FIG. 1 of the present application is disclosed in our commonly owned copending application Ser. No. 250,381 filed Apr. 2, 1981 for "Friction Clutch Unit".

BACKGROUND OF THE INVENTION

The present invention relates to friction clutches in general, and more particularly to improvements in friction clutch assemblies or units of the type comprising a plurality of coaxial friction clutches. Such friction clutch assemblies can be utilized in automotive vehicles and may include a first clutch which is engaged when the operator of the vehicle desires to transmit torque from the rotary output element of the engine (e.g., from the crankshaft) to a driven element (such as a flywheel), and a second clutch which may be incorporated in the flywheel and serves to connect the latter with the input element of a change-speed transmission. In such clutch assemblies, the friction disc of the first clutch is connected with and receives torque from the crankshaft, and the friction disc of the second clutch is connected with and transmits torque to the input element of the transmission. Each friction disc is flanked by a pair of pressure plates, and at least one pressure plate of each such pair is movable axially of the clutches and can be biased to bear against the respective friction disc.

Friction clutch assemblies of the above outlined character were proposed for use in automotive vehicles in order to reduce the fuel requirements of the internal combustion engines. This is to be accomplished by ensuring that, whenever the engine does not drive the vehicle (e.g., during idling, when the vehicle travels downhill or during short-lasting halts of the vehicle in front of a stop sign or traffic light), the torque transmitting connection between the crankshaft of the engine and the flywheel is interrupted and the engine is arrested. The flywheel continues to rotate and the engine is restarted, as soon as the vehicle is set in motion again, by the simple expedient of reengaging the first clutch so that the flywheel constitutes the starter of the engine. In such conventional friction clutch assemblies, the two friction clutches are disengaged or engaged independently of each other, i.e., the assembly comprises or is combined with discrete release means for each of the two friction clutches. Each release means may comprise a linkage which is operated by a pneumatic motor and a release member which effects actual disengagement of the respective friction clutch.

A drawback of the just described conventional friction clutch assemblies is that their clutches are quite complex and expensive as well as that the provision of two discrete clutch release means contributes to the bulk and initial as well as maintenance cost of the apparatus. The release means are sensitive and hence prone to malfunction. The provision of discrete motors for the two release means contributes significantly to the complexity and cost of the assemblies.

OBJECTS AND SUMMARY OF THE INVENTION

An object of the invention is to provide a friction clutch assembly or unit with several coaxial friction clutches which is simpler, more rugged, more compact and less expensive than heretofore known friction clutch assemblies.

Another object of the invention is to provide a friction clutch assembly whose versatility exceeds that of present known assemblies.

A further object of the invention is to provide a friction clutch assembly of the above outlined character with novel and improved actuating means which enables the friction clutches to begin or terminate or interrupt the transmission of torque from the respective driving to the associated driven elements.

An additional object of the invention is to provide a friction clutch assembly which can be utilized with advantage in automotive vehicles to save energy and to enable the operator of the vehicle to control the condition of the engine under circumstances which are conductive to achievement of savings in fuel.

Still another object of the invention is to provide a friction clutch assembly whose operation is more predictable than that of heretofore known assemblies, which can be mass-produced and assembled at reasonable cost, and which can be installed in certain existing vehicles as a superior substitute for heretofore known friction clutch assemblies or units with several coaxial clutches.

An ancillary object of the invention is to provide novel and improved means for biasing the axially movable components of friction clutches in the above-outline friction clutch assembly against the adjacent components of the respective clutches to thereby establish torque transmitting connections between the axially movable and adjacent components.

Another object of the invention is to provide the friction clutch assembly with novel and improved means for terminating the bias of the just outlined biasing means.

The invention resides in the provision of a friction clutch assembly or unit wherein a first clutch establishes or terminates a torque transmitting connection between a rotary driving element and a coaxial first driven element (for example, between a driving element which constitutes the crankshaft of an internal combustion engine and a first driven element constituting a flywheel which, in disengaged condition of the first clutch, is rotatable relative to the crankshaft and vice versa), wherein the first driven element contains or is associated with a second friction clutch for establishment or termination of a torque transmitting connection between the first driven element and a coaxial second driven element (the second driven element may constitute the rotary input shaft of a change-speed transmission in an automotive vehicle which embodies the aforementioned engine), wherein the first and second clutches respectively comprise a first friction disc adapted to be driven by the driving element and a second friction disc driving the second driven element, wherein each of the friction clutches has a pair of pressure plates flanking the respective friction disc and wherein at least one pressure plate of each friction clutch is movable axially of the driving and driven elements to be biased against or to be disengaged from the corresponding friction disc (each clutch may comprise a single axially movable pressure plate and the two clutches may comprise discrete axially fixed pressure plates or a common axially fixed pressure plate between the axially movable pressure plates of the two clutches).

In accordance with a feature of the invention, the clutch assembly comprises common actuating means which is operable to engage and disengage the first and second clutches, preferably in a given sequence (for example, the second clutch can be disengaged ahead of the first clutch and the first clutch can be reengaged ahead of the second clutch).

The friction clutch assembly further comprises means for biasing the pressure plates against the respective friction discs in engaged condition of the clutches, and such biasing means (preferably including one or more dished springs) can be said to form part of the actuating means for the clutches.

If the actuating means comprises a dished spring, such spring includes or may include a first region which serves to (directly or indirectly) bias the axially movable pressure plate of one of the clutches (e.g., of the first clutch) in engaged condition of the one clutch, and a second region which is located radially inwardly of the first region and serves to bias the axially movable pressure plate of the other clutch in engaged condition of the other clutch. The actuating means can further comprise seat means (such seat means may form part of the housing of the friction clutch assembly or it may be connected to an axially fixed pressure plate if the housing is movable with one or more axially movable pressure plates) which is adjacent to an intermediate portion of the dished spring, namely, a portion between the first and second regions of such spring. The latter further comprises a second portion which is located radially inwardly of the second region and is operatively connected with a pivoting means of the actuating means, namely, with a means which can move the second portion of the dished spring in a first axial direction to thereby disengage the friction clutches or in a second axial direction counter to the first direction to thereby reengage the clutches. The seat means and the intermediate portion of the dished spring preferably define a clearance in engaged condition of the clutches, and such clearance is reduced to zero during or after disengagement of one of the clutches and preparatory to disengagement of the other clutch. When the pivoting means is moved in a direction to reengage the clutches, the clearance is reestablished subsequent to engagement of one of the clutches and preparatory to or during engagement of the other clutch.

The novel features which are considered as characteristic of the invention are set forth in particular in the appended claims. The improved friction clutch assembly itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
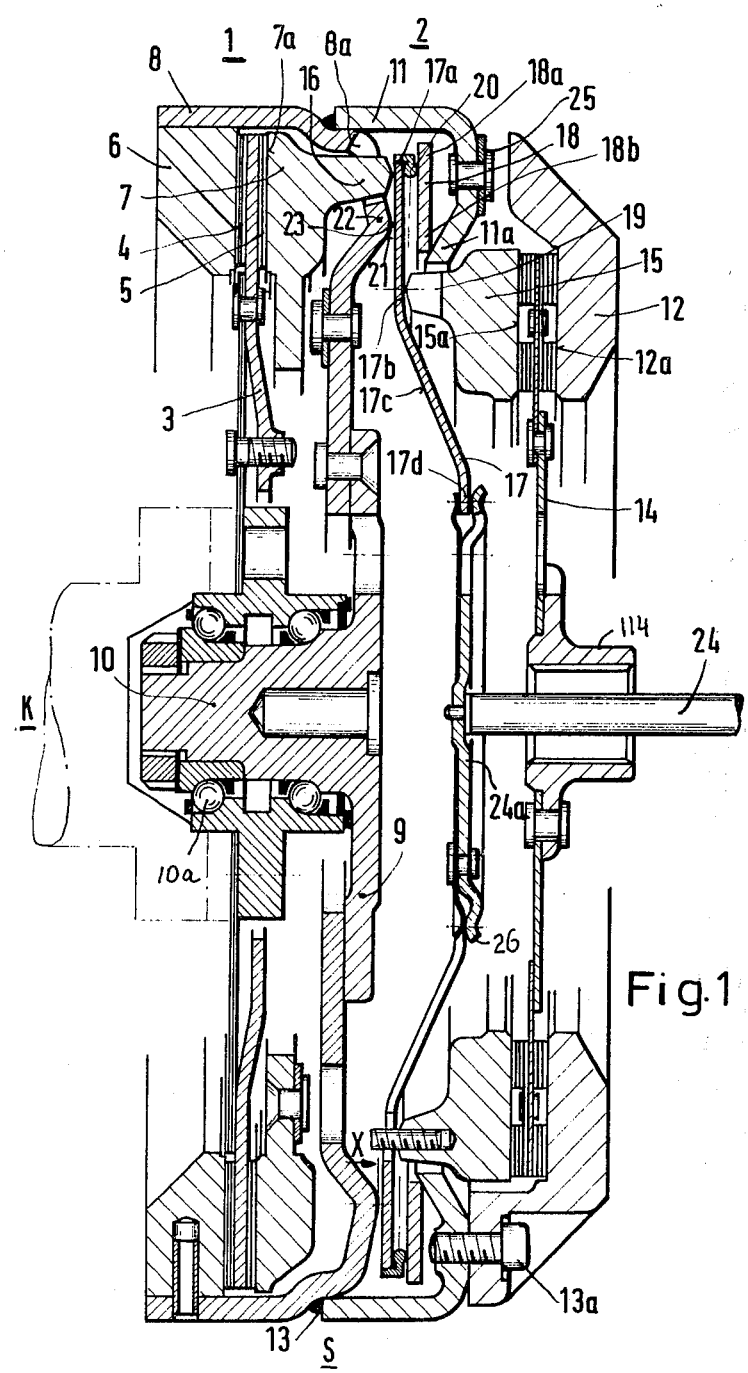
FIG. 1 is an axial sectional view of a friction clutch assembly or unit which embodies one form of the invention.

Referring first to FIG. 1, there is shown a friction clutch assembly or unit including a first friction clutch 1 and a second clutch 2 which is coaxial with the first clutch. The reference character K denotes the crankshaft of an internal combustion engine which constitutes the rotary driving or input element for the first clutch 1 and serves to transmit torque to a flywheel S (first driven element) when the first clutch is engaged. The flywheel S can rotate a second driven element 114 which may constitute or form part of the input shaft of a transmission of the type customarily used in a road vehicle, such as an automotive vehicle, which embodies the internal combustion engine including the crankshaft K. The flywheel S can rotate the input shaft of the transmission in response to engagement of the second clutch 2. The clutch 2 can be said to be incorporated in or to form part of the flywheel S.

The crankshaft K drives a motion transmitting friction disc 3 which is provided with friction linings 4 and 5 at the opposite sides thereof. The lining 4 is adjacent to an axially fixed pressure plate 6 which forms part of the first clutch 1, and the lining 5 is adjacent to an axially movable pressure plate 7 which also forms part of the first clutch and constitutes one element of the aforementioned flywheel S. When the pressure plate 7 is biased in a direction to the left, as viewed in FIG. 1, so that it bears against the friction lining 5, the lining 4 is urged against the adjacent surface of the pressure plate 6 so that the friction disc 3 transmits torque to the pressure plates 6 and 7. The axially fixed pressure plate 6 of the first clutch 1 faces the internal combustion engine which includes the crankshaft K, and the pressure plate 7 faces the second clutch 2.

The axially fixed pressure plate 6 is connected with a cupped housing section 8 which confines the friction disc 3 and the axially movable pressure plate 7. The radially inwardly extending portion 8a of the cupped housing section 8 is connected to the flange 9 of a bearing pin 10 which is rotatably mounted in the right-hand end portion of the crankshaft K wherein it rotates within one or more antifriction bearings 10a. It will be noted that the housing section 8 is held against axial movement but is rotatable relative to the crankshaft K.

The housing or casing of the friction clutch assembly or unit shown in FIG. 1 further comprises a second cupped housing section 11 which partially overlies the right-hand portion of the housing section 8 and is welded thereto, as at 13. The second housing section 11 comprises radially inwardly extending portions 11a which carry a pressure plate 12 forming part of the second clutch 2. The means for separably securing the pressure plate 12, which is held against axial movement relative to the crankshaft K, to the portions 11a of the second housing section 11 comprises an annulus of screws 13a, rivets or analogous fasteners. The pressure plate 12 has a friction generating surface 12a facing toward the clutch 1 and toward the adjacent surface of a friction disc 14 forming part of the second clutch. The left-hand side of the friction disc 14 is adjacent to the friction generating surface 15a of an axially movable pressure plate 15 forming part of the second clutch 2. The friction generating surface 15a of the pressure plate 15 faces away from the friction generating surface 7a of the pressure plate 7 forming part of the first clutch 1.

The axially movable pressure plate 7 of the first clutch 1 comprises an annulus of projections or lobes 16 which extend through complementary openings or cutouts defined by the radially inwardly extending portion 8a of the housing section 8. The tips of the projections 16 are normally contacted by a dished first clutch spring 17 which is interposed between the housing section 8 and a dished second clutch spring 18. The first clutch spring 17 has a radially outermost portion or region 17a which engages the projections 16 of the pressure plate 7. Thus, when the first clutch 1 is engaged, the portion or region 17a of the spring 17 urges the pressure plate 7 against the friction disc 3 which, in turn, is urged against the axially fixed pressure plate 6 so that the parts 6, 3, 7, 8, 11 and 17 rotate as a unit at the angular velocity of the crankshaft K as long as the first clutch 1 remains engaged.

The pressure plate 15 of the second clutch 2 has an annulus of discrete projections or lobes 19 which extend in a direction to the left through the central opening of the second clutch spring 18 and engage a region or portion 17b of the first clutch spring 17. The region 17b is located radially inwardly of the outermost region 17a which latter normally engages the projections 16 of the pressure plate 7. In this manner, the dished clutch spring 17 is maintained in tensioned condition between the pressure plates 7 and 15. Consequently, the spring 17 biases the pressure plate 15 in a direction to the right, as viewed in FIG. 1, so that the pressure plate 15 urges the friction disc 14 against the pressure plate 12 to thereby maintain the second clutch 2 in engaged condition.

The second clutch spring 18 comprises a radially outermost portion or region 18a which abuts against a ring-shaped seat 20 interposed between the region 18a and the region 17a of the first clutch spring 17. Furthermore, the second clutch spring 18 comprises a radially intermost portion or region 18b which abuts against the radially inwardly extending portion 11a of the second housing section 11. The second housing section 11, which is connected with the first housing section 8, surrounds or confines the clutch springs 17 and 18. The portion 11a constitutes an axially fixed abutment for the region 18b, i.e., the spring 18 reacts against the housing 8, 11 and normally biases the pressure plate 7 via seat 20 and region 17a.

The first clutch spring 17 can abut against a ring-shaped fulcrum or seat 21 which is disposed between the regions 17a and 17b and is defined by a circumferentially complete annular bead 22 of the radially inwardly extending portion 8a of the housing section 8. In other words, the seat 21 is disposed between the annuli of projections 16 and 19, as considered in the radial direction of the clutches 1 and 2. The seat 21 is adjacent to that side or surface (17c) of the first clutch spring 17 which faces away from the second clutch spring 18. The reference character X denotes a relatively narrow clearance or gap between the seat 21 and the side or surface 17c of the clutch spring 17 when the clutches 1 and 2 are engaged in a manner as shown in FIG. 1. The housing section 8 may constitute a metallic stamping and the bead 22 can be formed by appropriate deformation of the portion 8a which extends radially inwardly toward and is connected to the aforementioned flange 9 of the bearing pin 10. That annular portion of the surface 17c on the first clutch spring 17 which contacts the bead 22 when the spring 17 is deformed and/or pivoted so as to reduce the width of the clearance X to zero is denoted by the reference character 23. The portion 23 can be called a rolling portion of the surface 17c.

The actuating means for disengaging or engaging the clutches 1 and 2 comprises the springs 17, 18, the housing portion 8a (seat 21) and a pressure transmitting or pivoting member here shown as a bar or rod 24 which is coaxial with the crankshaft K and the left-hand end portion of which is secured to a shifting or moving plate 24a having a marginal portion 26 bolted riveted or otherwise secured to the radially intermost (second) portion 17d of the first clutch plate 17. The marginal portion 26 is connected to the innermost or second portion 17d of the first clutch spring 17 by rivets or other suitable fastener means.

When the member 24 is moved axially in a direction to the left, as viewed in FIG. 1, the shifting plate 24a causes the first clutch spring 17 to pivot with its radially outermost region 17a about the annulus of projections 16 so that the prestressed spring 17 acts not unlike a one-armed lever and thereby moves its region 17b away from the projections 19 of the pressure plate 15. Consequently, the pressure pleate 15 is free to move axially so that the frictional engagement between this pressure plate and the friction disc 14 is reduced or terminated and the clutch 2 including the pressure plates 12, 15 and friction disc 14 is disengaged ahead of the clutch 1.

As the member 24 continues to move in a direction to the left, the shifting plate 24a causes the first clutch spring 17 to reduce the distance between the seat 21 and the surface 17c to zero (i.e., the clearance X disappears) whereupon the annular surface portion 23 rolls along the seat 21 which is defined by the bead 22 of the housing section 8 and the clutch spring 17 behaves not unlike a two-armed lever which pivots at 21 to thereby move its outermost region 17a away from the annulus of projections 16. Consequently, the axially movable pressure plate 7 can move away from the friction disc 3 and the clutch 1 is disengaged. The radially outermost region 17a moves the radially outermost region 18a with it, i.e., in a direction to the right, as viewed in FIG. 1, so that the clutch spring 18 ceases to indirectly bias the pressure plate 7 toward the pressure plate 6.

In order to reengage the clutches 1 and 2, the member 24 is moved in a direction to the right, as viewed in FIG. 1, whereby the prestressed dished clutch spring 17 pivots about the seat 21 in the opposite direction and moves its radially outermost region 17a toward the projections 16 of the pressure plate 7 which is thereby biased against the lining 5 of the friction disc 3 which moves its lining 4 into requisite frictional engagement with the pressure plate 6. The bias of the outermost region 17a of the clutch spring 17 against the projections 16 is assisted by the outermost region 18a of the second clutch spring 18. As the member 24 continues to move in a direction to the right, as viewed in FIG. 1, the surface 17c of the first clutch spring 17 moves away from the seat 21 so that the clearance X is reestablished before the region 17b of the clutch spring 17 begins to bear against the projections 19 and thereby urges the axially movable pressure plate 15 of the second clutch 2 against the friction disc 14 which, in turn, bears against the axially fixed pressure plate 12.

The reference character 25 denotes in FIG. 1 one of several circumferentially distributed leaf springs or analogous coupling elements which connect the second housing section 11 with the axially movable pressure plate 15 of the second clutch 2. The leaf springs 25 enable the pressure plate 15 to move axially of the crankshaft K but hold this pressure plate against any angular displacement with reference to the housing sections 8 and 11. These leaf springs are accommodated in the space between the right-hand side of the second housing section 11 and the left-hand side of the axially fixed pressure plate 12 forming part of the second clutch 2.

The friction clutch assembly of FIG. 1 can be modified in a number of ways. For example, the dished springs 17, 18 can be replaced with annuli of coil springs and the pivoting or moving means 24, 24a of the actuating means for the friction clutches 1 and 2 can be replaced with conventional levers which serve to move the axially movable pressure plates toward and away from the associated friction discs. The dished springs which are shown in FIG. 1 are preferred at this time. A single dished spring (such as the spring 17) can serve as a component of actuating means which is common to the clutches 1 and 2, i.e., which can apply bias to the axially movable pressure plates 7 and 15 of both friction clutches and which can be caused to disengage the two clutches in a predetermined sequence, preferably the clutch 2 ahead of the clutch 1. During reengagement of the clutches, the clutch 1 is preferably engaged ahead of the clutch 2. It is not absolutely necessary that the spring 17 be installed in prestressed condition, i.e., it is also possible to provide an external energy source which stresses the spring 17 in engaged condition of the clutches 1 and 2. The arrangement which is shown in FIG. 1 is preferred because it is simpler and contributes to compactness of the friction clutch assembly, i.e., the spring 17 is installed in prestressed condition so that it is capable of applying the necessary forces which maintain the pressure plates 7 and 15 in requisite frictional engagement with the associated friction discs 3 and 4 until and unless the member 24 is moved axially for the express purpose of disengaging the two clutches. The positions of the annuli of projections 16 and 19 (as considered in the axial direction of the clutches 1, 2) and the positions of the members 24, 24a of the common actuating means for the two friction clutches are selected in such a way that the spring 17 is stressed owing to the fact that its region 17a bears against the projections 16 and its region 17b bears against the projection 19 in engaged condition of the two clutches. As explained above, at such time, the spring portion 23 and the seat 21 of the portion 8a of housing section 8 define the clearance X which disappears in response to axial movement of the members 24, 24a in a direction to disengage the two clutches. The clearance disappears during or after disengagement of the clutch 2, and the width of this clearance is or can remain zero when the clutch 1 is disengaged. Since the seat 21 forms part of the portion 8a which, in turn, forms part of the housing section 8, and the housing section 8 is rotatably mounted in or on but cannot move axially of the crankshaft K, the seat 21 cannot change its position, as considered in the axial direction of the clutches 1, 2, driving element K and driven elements S and 114. When the plate-like shifting member 24a of the actuating means is caused to move the innermost or second portion 17d of the spring 17 axially and in a direction to disengage the clutches 1 and 2, the member 24a must overcome the resistance which the prestressed spring 17 offers to the aforediscussed deformation, namely, to pivot it first at 17a and thereupon at 23 in order to disengage the clutch 2 ahead of the clutch 1. The portion 17d of the spring 17 may consist of an array of radially extending fingers or tongues which are separated from each other by elongated slots in a manner known from the art of Belleville springs of the type used in many friction clutches for automotive vehicles.

Another important advantage of the improved friction clutch assembly is that it employs or consists exclusively of rotationally symmetrical parts. This contributes to the ability of the assembly to reproducibly establish a predictable frictional engagement between the component parts of either clutch as often as desired. In other words, the RPM of each driven part is predictable with a high degree of accuracy because it is dependent solely on the RPM of the respective driving or torque-transmitting part.

A further important advantage of the improved friction clutch assembly is that the common actuating means for the friction clutches 1 and 2 is surprisingly simple, compact, rugged and inexpensive. Moreover, such actuating means can be manipulated by the operator of the vehicle with a minimum of effort and without necessitating a substantial amount of attention.

The second dished spring 18 can be replaced with a group of two or more additional dished springs or by additional biasing means in the form of an annulus of coil springs reacting against axially fixed abutment means (such as the portion 11a of the housing section 11) and bearing against the seat 20 or directly against the region 17a of the common dished spring 17. If desired, the abutment or portion 11a of the housing section 11 can extend radially outwardly beyond the region 17a of the spring 17, i.e., that portion or region of the dished spring 18 which reacts against an axially fixed abutment can be located radially outwardly of the outermost region of the spring 17. However, the arrangement of FIG. 1 (wherein the region 18b of the spring 18 is located radially inwardly of the region 17a of the spring 17) is preferred at this time because it contributes to compactness of the friction clutch assembly.

In the embodiment of FIG. 1, the projections 19 of the axially movable pressure plate 15 forming part of the second friction clutch 2 are biased exclusively by the region 17b of the common dished spring 17, namely, by the region which is the inner one of the two regions 17a, 17b (as considered in the radial direction of the clutches 1 and 2).

As explained above, the spring 17 acts not unlike a one-armed lever while its region 17a pivots relative to the projections 16 of the pressure plate 7, and as a two-armed lever while its portion 23 pivots or rolls along the seat 21. The transmission ratio or lever arm of the spring 17 during pivoting of the region 17a relative to the projections 16 is preferably different from (smaller than) the transmission ratio or lever arm during pivoting of the portion 23 along the seat 21. The two transmission ratios can be readily related to each other in such a way that the force which is needed to disengage the clutch 1 does not appreciably exceed the force which is needed to disengage the clutch 2 in spite of the fact that the projections 16 of the pressure plate 7 are biased by two dished springs when the clutch 1 is engaged. The transmission ratio during disengagement of the second clutch 2 is preferably in the range of between two and five, whereas the other transmission ratio is or may be in the range of between four and six. It can also be said that the rate at which the spring 17 reduces the bias upon the axially movable pressure plate 15 of the clutch 2 prior to elimination of the clearance X (i.e., during disengagement of the clutch 2) is different from the rate of reduction of bias upon the projections 16 of the pressure plate 7 upon elimination of the clearance X, i.e., during disengagement of the clutch 1.

It has been found that the construction of the improved friction clutch assembly is especially simple and that the clutch assembly can constitute a compact aggregate (as considered in the axial and/or radial direction of the clutches 1 and 2) if the constituents of the two clutches and of the actuating means therefor are assembled in the following sequence (as considered in the axial direction of the clutches, starting at the crankshaft K and proceeding toward the second driven element or input shaft 114): The axially fixed pressure plate 6 of the first clutch 1 is located between the internal combustion engine which embodies the crankshaft K and the friction disc 3, the latter 1 disposed between the pressure plates 6 and 7, the pressure plate 7 is disposed between the friction disc 3 and the radially inwardly extending poriton 8a of the housing section 8 (which is rigid with the axially fixed pressure plate 6, which defines the seat 21 for the portion 23 of the spring 17 and which is rotatable, with the section 8, relative to the crankshaft K by being installed in or on the crankshaft by means of the bearing 10 and its flange 9), the spring 17 is disposed between the portion 8a and the spring 18 (i.e., between the axially movable pressure plates 7 and 15 of the clutches 1 and 2), the spring 18 is disposed between the spring 17 and the abutment or portion 11a of the axially fixed housing section 11, the axially movable pressure plate 15 of the second clutch is disposed between the portion 11a and the friction disc 14, and the disc 14 is disposed between the pressure plates 15 and 12, the latter being affixed to the housing section 11 so that it is held against movement in the axial direction of the clutches.

As explained above, the section 8 of the housing and its portion 8a may constitute a stamping so that the bead 22 can be formed by resorting to relatively simple machinery which is capable of deforming the portion 8a so as to provide the seat 21 for the portion 23 of the spring 17. The bead 22 may be a circumferentially complete bead or it may consist of several arcuate sections or portions together forming a substantially annular seat for the spring 17 intermediate the regions 17a and 17b.

Figure 3:
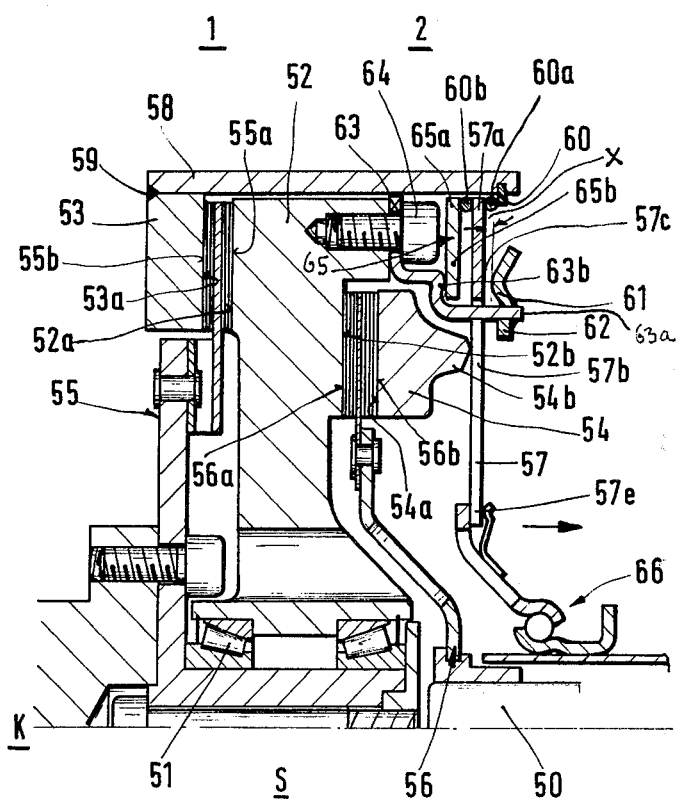
FIG. 3 is a fragmentary axial sectional view of a third friction clutch assembly.

If desired, the portion 11a of the housing section 11 can be omitted. The abutment means for the region 18b of the dished spring 18 is then defined by the portion 8a of the housing section 8. To this end, the spring 17 can be provided with openings or cutouts for axially extending arms which are provided on the portion 8a and extend through the central opening of the spring 18 to engage the right-hand side of the spring 18 in the region 18b. A somewhat similar mounting of the seat for the common dished spring (57) is shown in FIG. 3.

Figure 2:
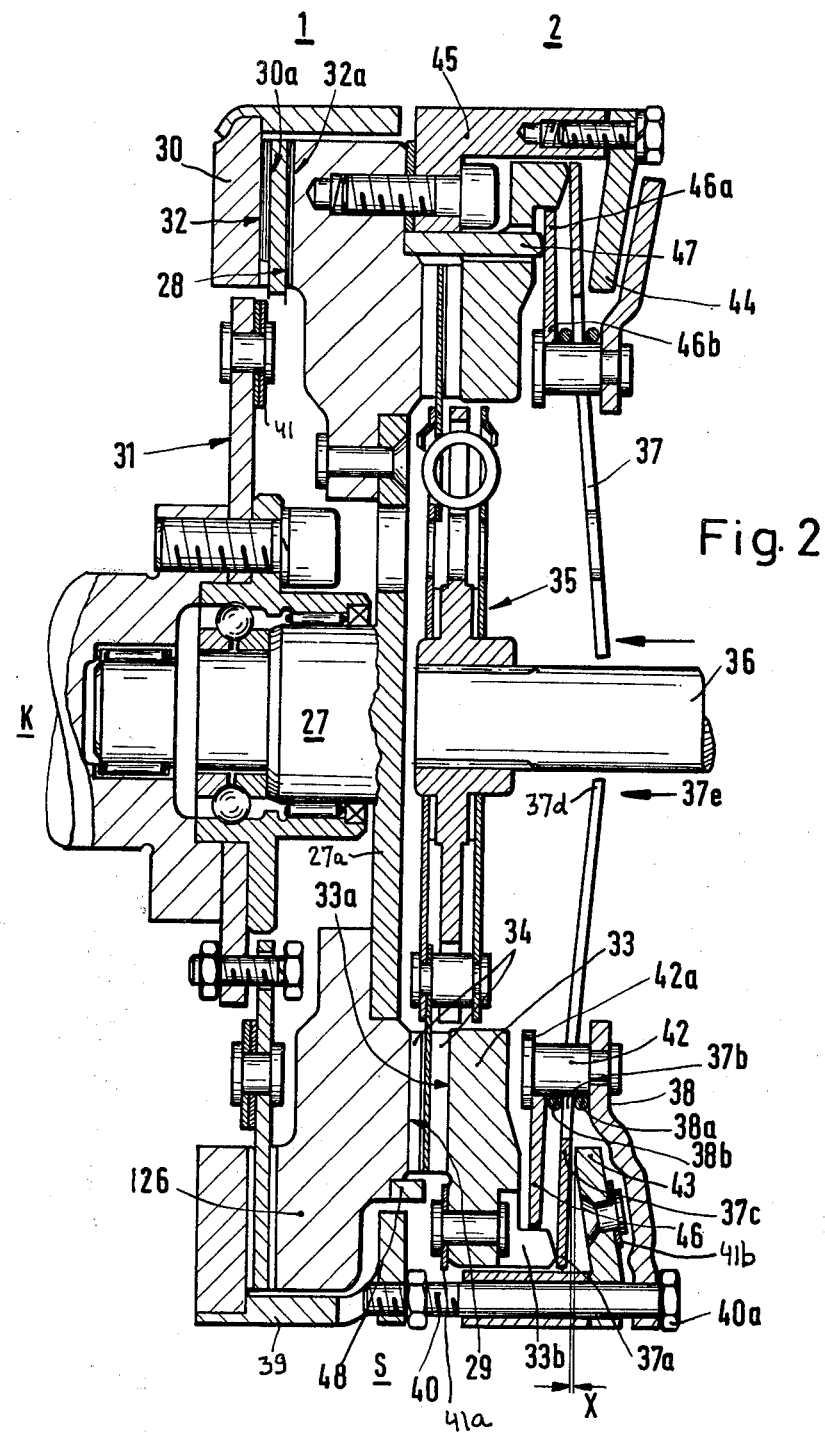
FIG. 2 is an axial sectional view of a second friction clutch assembly.

FIG. 2 illustrates a second friction clutch assembly or unit which again comprises a crankshaft K forming part of an internal combustion engine, a first clutch 1 which can separably couple the crankshaft K to a flywheel (first rotary driven element) S, and a second clutch 2 which can separably couple the flywheel S with a second rotary driven element 36 constituting the input shaft of a change-speed transmission which is installed in the automotive vehicle including the engine which comprises the crankshaft K.

The first clutch 1 of FIG. 2 comprises an axially fixed pressure plate 126 which is secured to the flange 27a of a bearing pin 27 rotatably mounted in the right-hand end portion of the crankshaft K. The pressure plate 126 has a friction generating surface 28 which is adjacent to the corresponding friction generating surface 32a of a friction disc 31 interposed between the pressure plate 126 and an axially movable pressure plate 30 of the first clutch 1. The axially fixed pressure plate 126 further forms part of the second clutch 2 and, to this end, has a second or right-hand friction generating surface 29 which faces away from the axially movable pressure plate 30 of the first clutch 1. The axially movable pressure plate 30 is disposed at that side of the friction disc 31 which is nearer to the engine including the crankshaft K. The reference character 30a denotes the friction generating surface of the pressure plate 30, and the corresponding friction generating surface of the friction disc 31 is denoted by the reference character 32. The friction disc 31 is permanently or separably connected to and shares all angular movements of the crankshaft K.

The second clutch 2 of FIG. 2 further comprises an axially movable pressure plate 33 which is remote from the pressure plate 30, i.e., the common axially fixed pressure plate 126 is disposed between the pressure plates 30 and 33. The pressure plate 33 has a friction generating surface 33a which is adjacent to one side of a friction disc 35 forming part of the second clutch 2 and connected to the input shaft 36 of the aforementioned change-speed transmission. The friction disc 35 has friction linings 34 at the opposite sides thereof. One of the linings 34 is adjacent to the surface 29 of the pressure plate 126, and the other lining 34 is adjacent to the surface 33a of the pressure plate 33.

The dished spring 37 of the assembly or unit shown in FIG. 2 has a radially outermost portion or region 37a which bears against an annulus of projections or lobes 33b on the pressure plate 33. Furthermore, the spring 37 has a second portion or region 37b which is located radially inwardly of the region 37a and bears against a cover member or portion 38 which is fixed to the axially movable pressure plate 30 of the first clutch 1 so that the spring 37 is tensioned between the regions 37a and 37b and the friction disc 35 is clamped between the pressure plates 126 and 33. The spring 37 further biases the pressure plate 30 of the first clutch 1.

The pressure plate 30 is connected to or integral with a cupped housing section 39 which enables the clutch spring 37 to bias the pressure plate 30 and contributes to development of a seat for the region 37b of the spring 37. The section 39 is connected with the cover member 38 by screws 40 or analogous fasteners. The radially outermost part of the cover member 38 is held by the enlarged outer end portions or heads 40a of the screws 40.

The spring 37 is installed between ring-shaped additional seats 38a and 38b which are connected with the cover member 38 by bolts 42. These additional seats enable the spring 37 to pivot with reference to the cover member 38. The pivoting takes place at the region 37b. A further seat or stop 43 which is held against axial movement is provided for the spring 17 intermediate the regions 37a and 37b. That portion of the respective surface of the spring 37 which can engage the seat or stop 43 is shown at 37c. The seat or stop 43 is provided on a radially inwardly extending further housing section 44 which is connected with the axially fixed pressure plate 126 by an axially extending housing section 45.

A dished second spring 46 is provided to apply additional bias to the axially movable pressure plate 30 of the first clutch 1. The bias of the spring 46 exceeds that of the spring 37. Therefore, when the clutches 1 and 2 are to be disengaged, the spring 37 is biased first in the region 37b between the seats 38a and 38b so as to relieve the pressure plate 33 of the second clutch 2. This enables the pressure plate 33 to move in a direction to the right, as viewed in FIG. 2, and to relax the pressure upon the friction disc 35. During this stage, the force which the first clutch 1 generates to transmit torque from the crankshaft K to the flywheel S is reduced accordingly, i.e., to an extent which is proportional to the reduction of pressure upon the friction disc 35 and the pressure plate 33 of the second clutch 2. This is due to the fact that the spring 37 then opposes the action of the second clutch spring 46. When the spring 37 has reduced the width of the clearance X between the portion 37c and the seat or stop 43 to zero, its portion 37c contacts the seat 43 and, as the spring 37 begins to pivot with reference to the seat 43, it pivots the second spring 46 which bears against the spring 37 on the one hand and against the collars or flanges 42a of the bolts 42 on the other hand. Such pivoting of the second spring 46 results in relaxation of pressure against the axially movable pressure plate 30 of the first clutch 1 by way of the cover member 38, screws 40 and cupped housing section 39. The pressure plate 30 moves in a direction to that left, as viewed in FIG. 1, and releases the friction disc 31.

The spring 46 has a radially outermost portion or region 46a which bears against projections 47 provided on a supporting ring 48 which is secured to the axially fixed common pressure plate 126. The projections 47 of the ring 48 extend through openings or cutouts provided therefor in the axially movable pressure plate 33 of the second clutch 2. The radially innermost portion 46b of the second clutch spring 46 indirectly bears against the first clutch spring 37 through the medium of the additional seat 38b. The bolts 42 center the second clutch spring 46 by contacting the inner marginal portion of this spring. The collars or flanges 42a of the bolts 42 overlie the left-hand side of the innermost portion or region 46b so that the region 46b, the additional seat 38b, the region 37b of the spring 37 and the additional seat 38a are articulately connected to the cover member 38 but cannot move axially with respect thereto.

When the clutches 1 and 2 are engaged, the portion 37c of the first clutch spring 37 and the seat or stop 43 define the aforementioned clearance X. The reference characters 41, 41a and 41b denote leaf springs or analogous means for holding the pressure plate 30, the section 39, the pressure plate 126, the pressure plate 33, the section 44 and the member 38 against angular movement with reference to each other. At the same time, the leaf springs 41, 41a and 41b enable at least some of the just enumerated parts to move relative to each ohter in the axial direction of the clutch 1 or 2.

In order to disengage the clutches 1 and 2 of FIG. 2, the radially innermost (second) portion 37d of the first spring 37 (such radially innermost portion may comprise a plurality of discrete fingers or prongs extending toward the short of the peripheral surface of the shaft 36) is shifted by the pivoting means (denoted by the arrow 37e) of the actuating means so as to move in a direction to the left, as viewed in FIG. 2. In order to thereupon reengage the two clutches of FIG. 2, the innermost portion 37d of the spring 37 is moved in a direction to the right so that its portion 37c rolls along the seat or stop 43 and thereby engages the first clutch 1. The pressure plate 30 and the section 39, screws 40 and cover member 38 move in a direction to the right, as viewed in FIG. 2, until the clutch 1 is at least substantially engaged whereupon the spring portion 37c moves away from the seat 43 and its region 37b pivots between the additional seats 38a, 38b to move the pressure plate 33 of the second clutch 2 in a direction to the left until the clutch 2 is fully engaged.

It will be noted that, in contrast to the construction of the friction clutch assembly of FIG. 1, the radially outermost region 37a of the spring 37 shown in FIG. 2 bears against the projections 33b of the axially movable pressure plate 33 of the second clutch 2 when the latter is engaged. Thus, the region 37b which biases the axially movable pressure plate 30 forming part of the first clutch 1 is located radially inwardly of the region 37a and portion 37c. The mounting of additional seats 38a, 38b on an axially movable component (cover member or portion 38) contributes to simplicity and compactness of the friction clutch assembly because such additional seats can share the movements of the region 37b and pressure plate 30 during engagement or disengagement of the first clutch 1.

The feature that the portion or region 46a of the second spring 46 reacts against the axially fixed common pressure plate 46 by way of the ring 48 and projections 47, and that the portion or region 46b of the spring 46 biases the axially movable pressure plate 30 of the first clutch 1 by way of the additional seats 38a, 38b, region 37b of the spring 37, cover portion or member 38 and housing section 39 also contributes to compactness of the friction clutch assembly.

The compactness of the friction clutch assembly which is shown in FIG. 2 is further enhanced by the illustrated distribution of its components, namely (and as seen in a direction from the crankshaft K toward the input shaft 36): The axially movable pressure plate 30 of the first clutch 1 is located between the internal combustion engine embodying the crankshaft K and the friction disc 31, the latter is located between the pressure plates 30 and 126 and is affixed to the crankshaft K, the common pressure plate 126 is rotatably mounted on or in but cannot move axially of the crankshaft K, the friction disc 35 of the second clutch 2 is located between the pressure plates 126, 33 and is rigid with the shaft 36, the second spring 46 is located between the pressure plate 33 and the spring 37, the region 37b of the spring 37 is flanked by the additional seats 38a and 38b which are movable axially of the clutches 1 and 2, and the seat 43 for the portion 37c of the spring 37 is located between the spring 37 and the axially movable cover portion 38 which carries the bolts 42 for the additional seats 38a, 38b. In addition, all three pressure plates (30, 126 and 33) are coupled to each other so that they rotate as a unit but the pressure plates 30 and 33 can move axially of the pressure plate 126. Furthermore, the cover member or portion 38 is movable axially with the pressure plate 30. It will be noted that the radially outermost region or portion 46a of the second spring 46 is located between the region 37a and the portion 37c of the spring 37, as considered in the radial direction of the clutches 1 and 2. Such mounting of the springs 37 and 46 is especially desirable if the bias of the spring 46 is greater than that of the spring 37.

The friction clutch assembly or unit of FIG. 3 comprises a first clutch 1 between the crankshaft K of the internal combustion engine and a flywheel S, and a second clutch 2 which can establish or terminate a torque transmitting connection between the flywheel S and the input shaft 50 of a change-speed transmission in the automotive vehicle which includes the engine embodying the crankshaft K.

The first clutch 1 comprises an axially fixed pressure plate 52 which is rotatably mounted on antifriction bearings 51 surrounding a stub of the crankshaft K so that the pressure plate 52 can turn with respect to but cannot move axially of the crankshaft. The pressure plate 52 is common to the clutches 1 and 2 and comprises a first friction generating surface 52a facing the friction disc 55 of the first clutch 1 and a second friction generating surface 52b facing the friction disc 56 of the second clutch 2. The axially fixed pressure plate 52 is flanked by the axially movable pressure plate 53 of the first clutch 1 and by the axially movable pressure plate 54 of the second clutch 2. The pressure plate 53 is disposed at that side of the friction disc 55 which faces the engine including the crankshaft K and has a friction generating surface 53a normally engaging a lining 55b of the friction disc 55. The latter has a second lining 55a which engages the friction generating surface 52a of the axially fixed pressure plate 52. The pressure plate 54 of the second clutch 2 has a friction generating surface 54a which normally bears against a similar surface 56b of the friction disc 56. The latter has a second friction generating surface 56a which normally engages the surface 52b of the pressure plate 52. The friction disc 55 is fixed to and shares all rotary movements of the crankshaft K so as to rotate the flywheel S when the first clutch 1 is engaged. The friction disc 56 is fixed to and rotates the input shaft 50 of the change-speed transmission.

A dished first spring 57 has a radially outermost portion or region 57a which engages a bearing 60 provided on a cylindrical housing section 58 which is rigid with the axially movable pressure plate 53. Thus, when the region 57a can apply a force against the bearing 60, the pressure plate 53 is urged against the friction disc 55 and the first clutch 1 is engaged. A second region or portion 57b of the spring 57 is located radially inwardly of the region 57a and abuts against an annulus of projections or lobes 54b on the axially movable pressure plate 54 forming part of the second clutch 2. Thus, the region 57b of the clutch spring 57 biases the two axially movable pressure plates 53 and 54 toward the axially fixed pressure plate 52.

The aforementioned housing section 58 is a hollow cylinder which is welded to the axially movable pressure plate 53, as at 59, and carries the aforementioned bearing 60 for the radially outermost portion or region 57a of the clutch spring 57. A ring-shaped seat 60a (e.g., a wire ring) is interposed between the bearing 60 and the region 57a. It will be noted that the indirect connection between the pressure plate 53 and the spring 57 is such that the latter pulls the pressure plate 53 toward the friction disc 55 of the first clutch 1.

An annular intermediate portion 57c of the spring 57 is disposed between the regions 57a, 57b and is adjacent to an axially fixed seat 61 which is a bead formed on a housing section 62. A further housing section 63 is fixedly secured to the pressure plate 52 by screws 64 or analogous fasteners and is formed with axially extending projections 63a extending through suitable openings or cutouts provided therefor in the spring 57 and carrying the ring-shaped housing section 62. The just mentioned openings or cutouts are radially extending slots between neighboring tongues or prongs of the spring 57; such prongs extend radially inwardly from the region 57b and their innermost portions 57e are coupled to a pivoting device 66 of the actuating means. When the clutches 1 and 2 of FIG. 3 are engaged, the seat 61 is separated from the portion 57c of the spring 57 by a clearance or gap X.

The pressure plate 53 of the first clutch 1 of FIG. 3 is further biased by a dished second clutch spring 65. The radially outermost portion or region 65a of the second spring 65 contacts a ring-shaped seat 60b which is adjacent to the region 57a of the first clutch spring 57. The radially innermost region or portion 65b of the second clutch spring 65 is adjacent to a seat here shown as a bead 63b of the axially fixed housing section 63.

In order to disengage the clutches 1 and 2 of FIG. 3, the pivoting device 66 of the actuating means including the springs 57, 65 and seat 61 is caused to move the radially innermost portions 57e of the prongs of the first clutch spring 57 in a direction to the right, as viewed in FIG. 3, whereby the spring 57 acts not unlike a one-armed lever and its radially outermost portion or region 57a pivots between the seats 60a, 60b to reduce the bias upon the axially movable pressure plate 54 of the second clutch 2, i.e., the friction disc 56 is released and ceases to transmit torque from the flywheel S to the input shaft 50 of the transmission. The spring 57 is weaker than the spring 65 and the just mentioned pivoting of the spring 57 at 57a reduces the bias of the spring 57 by the difference between the engaging and disengaging forces of this spring. When the spring 57 reduces the width of the clearance X to zero, i.e., when the portion 57c of the spring 57 reaches and begins to roll along the seat 61 of the section 62, the spring 57 acts not unlike a two-armed lever and its radially outermost region 57a bears against the radially outermost region 65a of the second spring 65 so that the springs 57 and 65 allow the pressure plate 53 to move in a direction to the left, as viewed in FIG. 3, and to relax the pressure upon the friction disc 55 so that the latter ceases to transmit torque from the crankshaft K to the flywheel S.

In order to reengage the clutches 1 and 2 of FIG. 3, the pivoting device 66 is moved in a direction to the left, as viewed in FIG. 3, whereby the spring 57 pivots about the seat 61 and cooperates with the spring 65 to move the pressure plate 53 back into engagement with the friction disc 55 which is biased against the pressure plate 52 to drive the flywheel S in response to rotation of the crankshaft K. At such time, the spring 57 does not act against the ring 60a with maximum force but rather with a reduced force corresponding to that between the radially innermost portions 57e of its prongs and the pivoting device 66. As the spring 57 continues to pivot in response to leftward movement of the device 66, its portion 57c moves away from the seat 61 to reestablish the gap X. The spring 57 then pivots in the region of its radially outermost portion 57a (i.e., between the seats 60a and 60b) whereby its region 57b bears against the projections 54b and moves the pressure plate 54 against the friction disc 56 to engage the second clutch 2. When the leftward movement of the device 66 is completed, the second clutch 2 of FIG. 3 is engaged with the full force of the spring 57 and, at such time, the full force of the spring 57 is also applied to the ring-shaped seat 60a to ensure that the spring 57 urges the pressure plate 53 against the friction disc 55 with a maximum force. The bias of the spring 57 upon the seat 60a is in addition to the bias of the second clutch spring 65.

In the friction clutch assembly of FIG. 3, the parts are arranged in the following order (as considered axially of the clutches 1, 2 and in a direction from the crankshaft K toward the input shaft 50): The axially movable pressure plate 53 is located between the internal combustion engine and the friction disc 55, the latter is fixed to the crankshaft K and is disposed between the pressure plates 53 and 52, the pressure plate 52 is rotatably mounted in or on the crankshaft K and is located between the friction discs 55, 56 the latter of which is affixed to and rotates the input shaft 50, the pressure plate 54 is located between the friction disc 56 and the spring 65 (the latter reacts against an axially fixed part 63b and bears against an axially movable part 60b), and the spring 57 is located between the spring 65 and the axially fixed seat 61.

It will be noted that, during disengagement of the clutches 1 and 2, the input shaft 50 is disconnected from the flywheel S before the latter is disconnected from the crankshaft K. During reengagement, the flywheel S is coupled to the crankshaft K ahead of establishment of a torque transmitting connection between the flywheel and the input shaft 50; however, the springs 57 and 65 bias the axially movable pressure plate 53 against the friction disc 55 with a maximum force only when the engagement of the second clutch 2 is completed.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. In a friction clutch assembly wherein a first clutch establishes or terminates a torque transmitting connection between a rotary driving element and a coaxial first driven element, such as between the crankshaft of an internal combustion engine and a flywheel which is rotatable with reference to the crankshaft, wherein the first driven element contains a second clutch for establishment or termination of a torque transmitting connection between the first driven element and a coaxial second driven element, such as between said flywheel and the input shaft of the transmission in an automotive vehicle embodying said engine, wherein said first and second clutches respectively comprise a first friction disc driven by said driving element and a second friction disc driving said second driven element, wherein each of said clutches has a pair of pressure plates flanking the respective friction disc and wherein at least one pressure plate of each clutch is movable axially of said elements and is adapted to be biased against the corresponding friction disc, the improvement which consists in the provision of common actuating means which is operable to engage and disengage said first and second clutches.

2. The improvement of claim 1, wherein said actuating means includes means for engaging and disengaging said clutches one after the other.

3. The improvement of claim 1, wherein said actuating means includes means for disengaging said second clutch ahead of said first clutch and for engaging said first clutch ahead of said second clutch.

4. The improvement of claim 1, further comprising means for biasing said pressure plates against the respective friction discs in engaged condition of said clutches, said biasing means for the pressure plates of at least one of said clutches forming part of said actuating means.

5. The improvement of claim 4, wherein said biasing means for said one clutch includes a dished spring.

6. The improvement of claim 1, further comprising common means for biasing the pressure plates of said first and second clutches against the corresponding friction discs in engaged condition of said clutches, said biasing means including a dished spring forming part of said actuating means.

7. The improvement of claim 1, wherein said actuating means comprises a dished spring for biasing the axially movable pressure plates of said first and second clutches in the axial direction of said elements, said spring having a first region arranged to bias the axially movable pressure plate of one of said clutches in engaged condition of said one clutch and a second region located radially inwardly of said first region and arranged to bias the axially movable pressure plate of the other of said clutches in engaged condition of said other clutch.

8. The improvement of claim 7, wherein said dished spring has a portion disposed between said first and second regions, as considered in the radial direction of said clutches, said actuating means further comprising seat means adjacent to said portion of said spring and means for pivoting said spring.

9. The improvement of claim 8, wherein said seat means and said portion of said spring define a clearance in engaged condition of said clutches, said seat means being fixed, as considered in the axial direction of said elements.

10. The improvement of claim 8, wherein said spring has a side facing said one clutch and said seat means is adjacent to said side of said spring.

11. The improvement of claim 8, wherein said pivoting means includes means for applying to said spring a disengaging force substantially axially of said elements and in a direction to reduce the bias of said spring upon said axially movable pressure plates.

12. The improvement of claim 8, wherein said seat means and said spring define a clearance in engaged condition of said clutches and said pivoting means comprises means for reducing the bias of said second region upon the axially movable pressure plate of said other clutch, for thereupon eliminating said clearance, and for subsequently rolling said portion of said spring along said seat means to thereby relax the bias of said first region upon the axially movable pressure plate of said one clutch in the course of disengagement of said clutches.

13. The improvement of claim 12, further comprising a second spring for biasing the axially movable pressure plate of said one clutch against the respective friction disc in engaged condition of said one clutch.

14. The improvement of claim 13, wherein said second spring is a dished spring.

15. The improvement of claim 13, wherein said first mentioned spring includes a part which is interposed between said second spring and the axially movable pressure plate of said one clutch.

16. The improvement of claim 15, wherein the axially movable pressure plate of said one clutch has a plurality of projections which are contacted by the first region of said first mentioned spring in engaged condition of said one clutch and said part of said first mentioned spring is said first region, and further comprising an annular seat interposed between said first region and said second spring.

17. The improvement of claim 13, further comprising a housing for said springs, said housing including a portion which is fixed as considered in the axial direction of said elements and is disposed radially outwardly of said first region, said second spring including a portion bearing against said axially fixed portion of said housing.

18. The improvement of claim 13, further comprising a housing for said springs, said housing including a portion which is fixed as considered axially of said elements and is located radially inwardly of said first region, said second spring having a portion bearing against said portion of said housing.

19. The improvement of claim 13, wherein said one clutch is said first clutch.

20. The improvement of claim 19, wherein said seat means and said portion of said first mentioned spring define a clearance in engaged condition of said clutches and said pivoting means includes means for pivoting said first region with reference to the axially movable pressure plate of said first clutch to thereby reduce the bias of said second region upon the axially movable pressure plate of said second clutch and to reduce said clearance to zero, and for thereupon rolling said portion of said first mentioned spring along said seat means to thereby reduce the bias of both said springs upon the axially movable pressure plate of said first clutch in the course of disengagement of said clutches.

21. The improvement of claim 20, wherein said pivoting means is operative to effect the movement of both said springs into force transmitting engagement with the axially movable pressure plate of said first clutch ahead of movement of said second region into force transmitting engagement with the axially movable pressure plate of said second clutch during engagement of said clutches, said first mentioned spring pivoting about said seat means in the course of application of force to the axially movable pressure plate of said second clutch and relative to the axially movable pressure plate of said first clutch in the course of application of force to the axially movable pressure plate of said first clutch whereby said portion of said first mentioned spring and said seat means reestablish said clearance not later than on completion of engagement of said first clutch.

22. The improvement of claim 12, wherein the rate at which said spring reduces the bias upon the axially movable pressure plate of said other clutch prior to elimination of said clearance deviates from the rate of reduction of bias upon the axially movable pressure plate of said one clutch upon elimination of said clearance in the course of disengagement of said clutches.

23. The improvement of claim 8, further comprising a housing which includes a first section defining said seat means, said actuating means further comprising a dished second spring for biasing the pressure plates of said first clutch against the respective friction disc in engaged condition of said first clutch, each of said clutches including an axially fixed pressure plate and an axially movable pressure plate and said seat means being disposed between said first mentioned spring and the axially movable pressure plate of said first clutch, said second spring being disposed between said first mentioned spring and said second clutch and said housing further comprising a second section defining an abutment for said second spring between said second clutch and said second spring.

24. The improvement of claim 23, further comprising bearing means rotatably mounting said first section on said driving element, said first section being cupped and being rigid with the axially fixed pressure plate of said first clutch.

25. The improvement of claim 24, wherein the axially movable pressure plate of said first clutch has an annulus of projections and said first section has openings through which said projections extend and are engaged by the first region of said first mentioned spring in engaged condition of said first clutch, said first section confining the friction disc and the axially movable pressure plate of said first clutch.

26. The improvement of claim 25, wherein said seat means includes an annular seat for said portion of said first mentioned spring.

27. The improvement of claim 23, wherein said second section confines said springs, said second spring having a first portion which abuts against the abutment of said second section and a second portion located radially outwardly of said first portion and bearing against the first region of said first mentioned spring.

28. The improvement of claim 8, further comprising a housing which defines said seat means for said portion of said spring, and first and second additional seats provided in said housing and flanking said second region of said spring, said spring further having a second portion located radially inwardly of said second region and said pivoting means comprising means for moving said second portion of said spring axially of said elements to thereby engage or disengage said clutches, depending on the direction of axial movement of said second portion.

29. The improvement of claim 28, wherein said additional seats are of annular shape.

30. The improvement of claim 28, wherein said seat means includes an annular stop which is held against movement in the axial direction of said elements, said spring having a side facing away from the axially fixed pressure plate of said other clutch and adjacent to said seat means, said seat means and said portion of said spring defining a clearance in engaged condition of said clutches.

31. The improvement of claim 28, wherein said housing includes means for connecting at least one of said additional seats with the axially movable pressure plate of said one clutch.

32. The improvement of claim 28, further comprising a second dished spring arranged to bias the axially movable pressure plate of said one clutch against the respective friction disc in engaged condition of said one clutch.

33. The improvement of claim 32, wherein said second spring reacts against the axially fixed pressure plate and bears against the axially movable pressure plate of said one clutch.

34. The improvement of claim 32, wherein said second spring includes a portion which biases said additional seats against said first mentioned spring.

35. The improvement of claim 32, wherein each of said clutches comprises an axially movable pressure plate and said clutches comprise a common axially fixed pressure plate, the axially movable pressure plate of said first clutch being more distant from said first mentioned spring than said common pressure plate and the axially movable pressure plate of said second clutch being disposed between said first mentioned spring and said common pressure plate, as considered in the axial direction of said clutches.

36. The improvement of claim 35, further comprising bearing means rotatably mounting said common pressure plate in said driving element, said second spring being interposed between said first mentioned spring and the axially movable pressure plate of said second clutch and reacting against said common pressure plate, said housing including a cover portion overlying said first mentioned spring and said additional seats being provided on said cover portion, said second spring bearing against one of said additional seats and said housing being connected to and being movable with the axially movable pressure plate of said first clutch, said seat means being held against movement in the axial direction of said clutches.

37. The improvement of claim 36, further comprising means for connecting said seat means to said common pressure plate.

38. The improvement of claim 36, further comprising an annulus of projections provided on said common pressure plate and engaged by said second spring, the axially movable pressure plate of said second clutch having openings for said projections.

39. The improvement of claim 38, wherein said projections contact said second spring between the first and second regions of said first mentioned spring, as considered in the radial direction of said clutches.

40. The improvement of claim 28, wherein said additional seats are movable axially of said clutches with the axially movable pressure plate of said first clutch and said spring has a second portion located radially inwardly of said regions thereof, said moving means being operative to move said second portion of said spring axially of said clutches in a predetermined direction to first terminate the bias of said spring upon the axially movable pressure plate of said second clutch and simultaneously reduce the bias of said spring upon the axially movable pressure plate of said first clutch, and to thereupon pivot said first mentioned portion of said spring about said seat means to thereby move said additional seats in a direction to disengage the axially movable pressure plate of said first clutch from the respective friction disc.

41. The improvement of claim 40, wherein said moving means is further operative to move said second portion of said spring axially of said clutches in a second direction counter to said predetermined direction to thereby first pivot said first mentioned portion of said spring about said seat means to reengage said first clutch while simultaneously moving said additional seats axially of said clutches and to thereupon disengage said first mentioned portion of said spring from said seat means and reengage said second clutch.

42. The improvement of claim 8, further comprising a housing connected with the axially movable pressure plate of said one clutch, the first region of said spring being arranged to pull the axially movable pressure plate of said one clutch against the respective friction disc by way of said housing in engaged condition of said one clutch and the second region of said spring being arranged to bear against the axially movable pressure plate of said other clutch.

43. The improvement of claim 42, wherein said spring includes a second portion located radially inwardly of said regions and said pivoting means is operatively connected with said second portion.

44. The improvement of claim 43, wherein said seat means is held against movement in the axial direction of said clutches and said spring is located between said seat means and the axially movable pressure plate of said other clutch, said seat means and said first mentioned portion of said spring defining a clearance in engaged condition of said clutches.

45. The improvement of claim 44, wherein said seat means is of annular shape.

46. The improvement of claim 44, further comprising a dished second spring arranged to bias the axially movable pressure plate of said one clutch in engaged condition of said one clutch.

47. The improvement of claim 46, wherein said one clutch is said first clutch.

48. The improvement of claim 46, further comprising an axially fixed abutment, said second spring having a first portion bearing against the first region of said first mentioned spring and a second portion reacting against said abutment.

49. The improvement of claim 48, wherein each of said clutches has an axially movable pressure plate and said clutches have a common axially fixed pressure plate between said axially movable pressure plates, and further comprising bearing means rotatably mounting said common pressure plate on said driving element, said second spring being disposed between said first mentioned spring and the axially movable pressure plate of said second clutch, said first mentioned spring being disposed between said second spring and said seat means and said housing including a portion connected with the first region of said first mentioned spring.

50. The improvement of claim 46, wherein said pivoting means includes means for moving said second portion of said first mentioned spring axially of said clutches in a predetermined direction to thereby terminate the bias of said second region upon the axially movable pressure plate of said other clutch, reduce the bias of said first region upon the axially movable pressure plate of said one clutch and eliminate said clearance, and to thereupon pivot said first mentioned spring relative to said seat means for terminating the bias of said springs upon the axially movable pressure plate of said one clutch.

51. The improvement of claim 50, wherein said moving means is further arranged to move said second portion of said first mentioned spring in a second direction counter to said predetermined direction to thereby reengage said one clutch ahead of said other clutch.

52. The improvement of claim 51, wherein the movement of said second portion of said first mentioned spring in said second direction entails pivoting of said first mentioned spring about said seat means to thereby effect a movement of the axially movable pressure plate of said one clutch into frictional engagement with the respective disc, reestablishment of said clearance and subsequent movement of said second region into force transmitting engagement with the axially movable pressure plate of said other clutch.

* * * * *